United States Patent

[11] 3,550,514

| [72] | Inventor | Donald M. Harvey |
| | | Webster, N.Y. |
| [21] | Appl. No. | 767,346 |
| [22] | Filed | Oct. 14, 1968 |
| [45] | Patented | Dec. 29, 1970 |
| [73] | Assignee | Eastman Kodak Company |
| | | Rochester, N.Y. |
| | | a corporation of New Jersey |

[54] ADAPTER FOR IGNITING ELECTRICALLY IGNITABLE FLASH LAMPS
15 Claims, 7 Drawing Figs.

| [52] | U.S. Cl. | 95/11, 240/1.3 |
| [51] | Int. Cl. | G03b 15/02 |
| [50] | Field of Search | 240/1.3; 95/11, 11.5; 431/92, 98 |

[56] References Cited
UNITED STATES PATENTS

| 3,360,639 | 12/1967 | Waggershauer | 240/1.3 |
| 3,375,484 | 3/1968 | Petts et al. | 240/1.3X |
| 3,400,261 | 9/1968 | Jacob | 240/1.3 |
| 3,465,138 | 9/1969 | Long | 95/11X |

*Primary Examiner*—John M. Horan
*Assistant Examiner*—Alan Mathews
*Attorneys*—Robert W. Hampton and William C. Dixon, III ABSTRACT: An adapter is provided to permit use of electrically ignitable flash lamps with a photographic apparatus, such as a camera, that has been designed for use with percussion-ignitable flash lamps, the apparatus having a striker which is rapidly movable to a firing site adjacent to a flash-lamp-receiving socket to percussively contact, and thereby ignite, a percussion-ignitable flash lamp received in the socket. The adapter comprises a socket for receiving an electrically ignitable flash lamp, means for receiving a source of electrical potential, and a circuit for electrically interconnecting a received flash lamp and a received source of electrical potential, the circuit including a pair of electrical conductors which are insertable into the socket of the apparatus so that one of the conductors is thereby located at the firing site while the other of the conductors is so disposed as to become electrically connected to the conductor at the firing site in response to movement of the striker into percussive contact with the conductor at the firing site, thereby closing the circuit and igniting the received flash lamp.

PATENTED DEC 29 1970
3,550,514
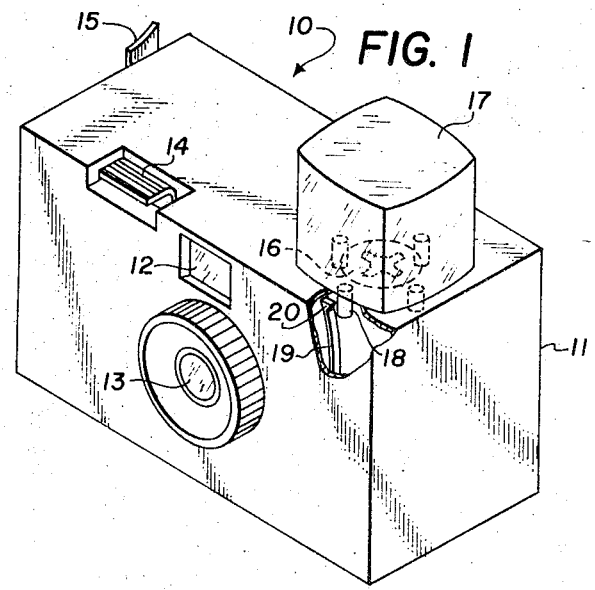
FIG. 1
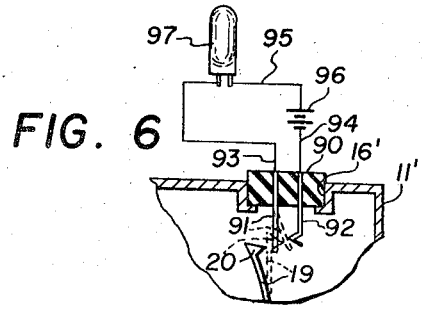
FIG. 6
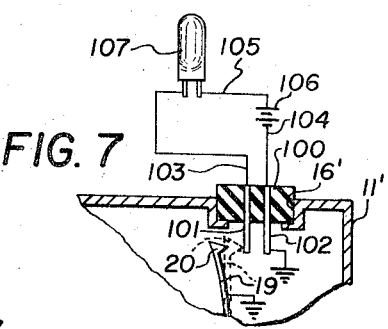
FIG. 7
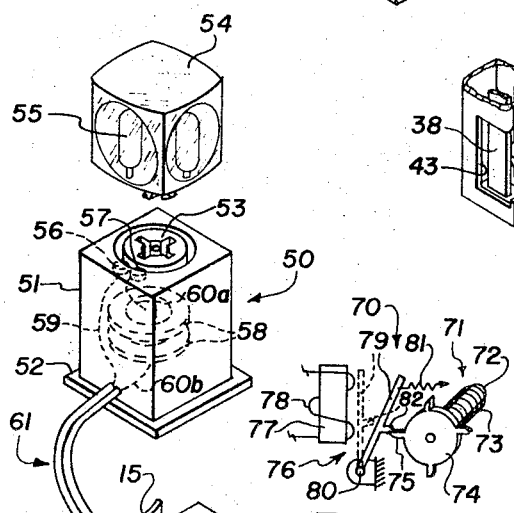
FIG. 3
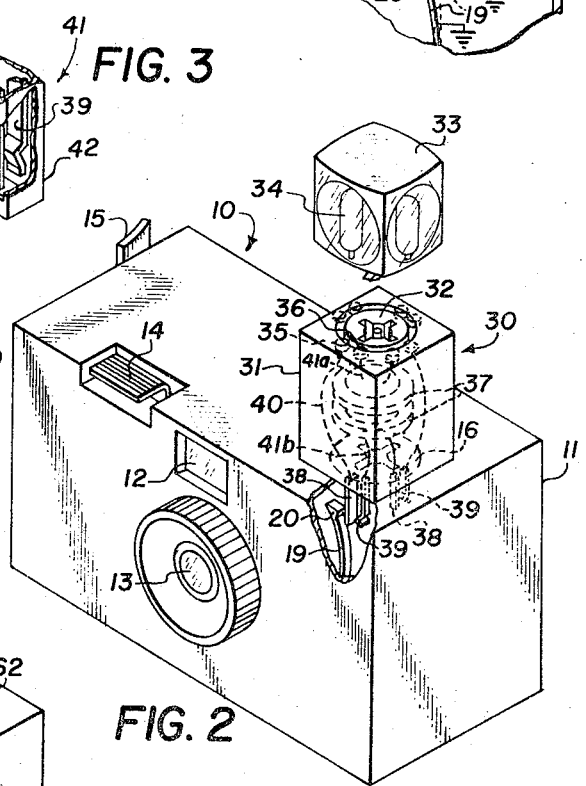
FIG. 2
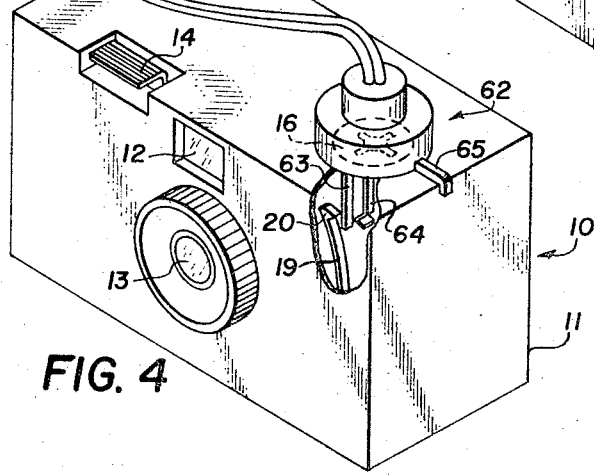
FIG. 5
FIG. 4
DONALD M. HARVEY
INVENTOR.
BY William C. Oxfer III
R. L. Hampton
ATTORNEYS 3,550,514

ADAPTER FOR IGNITING ELECTRICALLY IGNITABLE FLASH LAMPS

CROSS-REFERENCES TO RELATED APPLICATIONS

Reference is made to the following commonly assigned, copending U.S. Pat. applications:

Ser. No. 765,930, entitled Multilamp Flash Unit, filed Oct. 8, 1968 in the name of David E. Beach;

Ser. No. 765,931, entitled Socket for Multilamp Flash Unit, filed Oct. 8, 1968 in the name of David E. Beach; and Ser. No. 766,739, entitled Apparatus for Actuating Firing of Percussion-Ignitable Flashlamps and Operating Mechanism Therefor, filed Oct. 11, 1968 in the name of William T. Hochreiter.

BACKGROUND OF THE INVENTION

1. Field of the Invention

This invention relates generally to photographic apparatus, and particularly to an adapter permitting use of electrically ignitable flashlamps with photographic apparatus that have been designed for use with percussion-ignitable flashlamps.

2. Description of the Prior Art

It has long been known in the photographic art to ignite an electrically ignitable photoflashlamp by closing an electrical circuit to interconnect such a lamp and a suitable source of electrical potential. Photographic cameras having synchronizing contacts that are operative, upon opening of the camera shutter, to close such a circuit and thereby ignite an electrically ignitable flashlamp connected thereto are well known and commonplace in the photographic market.

There has recently been developed a self-contained, percussion-ignitable, flashlamp unit having a lamp envelope enclosing a combustible material and a combustion-supporting gas, with a metal tube extending from the bottom of the lamp envelope and containing a primer charge that is ignitable in response to percussive contact with the tube by a mechanically actuated striking member or hammer built into photographic apparatus adapted to receive such a unit. A flashlamp unit of this kind is described in commonly assigned, copending U.S. Pat. application Ser. No. 765,930, entitled Multilamp Flash Unit, filed Oct. 8, 1968, in the name of David E. Beach. A socket that is suitable for receiving and operatively supporting such a flashlamp unit is described in commonly assigned, copending U.S. Pat. application Ser. No. 765,931, entitled Socket for Multilamp Flash Unit, filed Oct. 8, 1968 in the name of David E. Beach. A photographic apparatus and a mechanism therein suitable for percussively igniting such a flashlamp unit supported in such a socket are described in commonly assigned, copending U.S. Pat. application Ser. No. 766,739, entitled Apparatus for Actuating Firing of Percussion-Ignitable Flashlamps and Operating Mechanism Therefor, filed Oct. 11, 1968 in the name of William T. Hochreiter.

None of the prior art teaches or suggests a way of effecting ignition of an electrically ignitable flashlamp unit of the type commonly in use today by the operation of photographic apparatus adapted specifically to ignite a percussion-ignitable flashlamp unit of the kind described. There is a need for a device that will permit use of electrically ignitable flashlamp units with such photographic apparatus.

SUMMARY OF THE INVENTION

Accordingly, an object of the present invention was to provide a device that would permit use of electrically ignitable flashlamp units with a photographic apparatus, such as a camera, that has been designed for use with percussion-ignitable flashlamp units. Another object was to provide such a device that would be suitable for use with a photographic apparatus having a striker which is rapidly movable to a firing site adjacent to a flashlamp-unit-receiving socket to percussively contact, and thereby ignite, a percussion-ignitable flashlamp unit received in the socket. A further object of the invention was to provide such a device that would be suitable for receiving and igniting a multilamp flash unit having a plurality of electrically ignitable flashlamps.

To meet these and other objects, the present invention provides a device, in the form of an adapter, which permits use of electrically ignitable flashlamp units with a photographic apparatus, such as a camera, that has been designed for use with percussion-ignitable flashlamp units, the apparatus having a striker which is rapidly movable to a firing site adjacent to a flashlamp-unit-receiving socket to percussively contact, and thereby ignite, a percussion-ignitable flashlamp unit received in the socket. The adapter comprises a socket for receiving and operatively supporting an electrically ignitable flashlamp unit, means for receiving and operatively supporting a source of electrical potential, and a circuit for electrically interconnecting a received flashlamp unit and a received source of electrical potential, the circuit including switch means operatively associatable with the firing site of the apparatus for closing the circuit in response to movement of the striker of the apparatus to the firing site.

In the two illustrated embodiments of the invention, the switch means includes a pair of electrical conductors which are insertable into the socket of the apparatus so that one of the conductors is thereby located at the firing site of the apparatus while the other of the conductors is so disposed as to become electrically connected to the conductor at the firing site in response to movement of the striker of the apparatus into percussive contact with the conductor at the firing site, thereby closing the circuit and igniting the received flashlamp unit.

In the preferred illustrated embodiment, the conductor located at the firing site of the apparatus is movable, when percussively contacted by the striker of the apparatus, into contact with the other conductor, thereby closing the circuit and igniting the received flashlamp unit. In one form of the preferred embodiment, the whole adapter is attachable to the apparatus by plugging the pair of connectors thereon into the socket of the apparatus. In another form of the preferred embodiment, the adapter includes a flexible power cord terminating in a plug having the pair of conductors that are insertable into the socket of the apparatus, the main portion of the adapter being positionable at a location remote from the apparatus in order to produce desired photoflash effects.

In the alternative illustrated embodiment, neither one of the pair of conductors need be movable relative to the other. The conductor located at the firing site of the apparatus need only be contactable by the striker of the apparatus because, upon insertion of the two conductors into the socket of the apparatus, the other conductor becomes electrically connected to the striker, so that, when the striker moves into percussive contact with the conductor at the firing site, the circuit becomes closed and the received flashlamp unit ignited. The alternative embodiment could equally well take either of the two forms described above with reference to the preferred embodiment.

The invention, and its objects and advantages, will become more apparent in the detailed description of the illustrated embodiments presented below.

BRIEF DESCRIPTION OF THE DRAWINGS

In the detailed description of the illustrated embodiments of the invention presented below, reference is made to the accompanying drawings, in which:

FIG. 1 is a perspective view of a photographic camera designed for use with a multilamp flash unit of the type having a plurality of percussion-ignitable flashlamps, showing such a flash unit supported in a suitable socket adjacent to a striking member of the camera;

FIG. 2 is a perspective view of the photographic camera of FIG. 1, showing an adapter constructed in accordance with one form of the preferred embodiment of the present invention supported in the camera socket;

FIG. 3 is a fragmentary perspective view of a base portion suitable for use on the adapter of FIG. 2;

FIG. 4 is a perspective view of the photographic camera of FIGS. 1 and 2, showing an adapter constructed in accordance with another form of the preferred embodiment of the present invention connected to the camera by a flexible power cord plugged into the camera socket;

FIG. 5 is a schematic view of a socket-rotating mechanism suitable for use in the adapter of FIG. 4;

FIG. 6 is a schematic view of the preferred illustrated embodiment of the present invention wherein one of two electrical conductors plugged into the camera socket is movable into contact with the other, when struck by the camera striking member, to close the lamp-igniting circuit; and FIG. 7 is a schematic view of the alternative illustrated embodiment of the present invention wherein one of two electrical conductors plugged into the camera socket is electrically connected to the camera striking member, which then strikes the other conductor to close the lamp-igniting circuit.

DESCRIPTION OF THE ILLUSTRATED EMBODIMENTS

Because certain parts of photographic and related apparatus are well known, the following description is directed in particular to those elements forming, or cooperating directly with, the present invention, elements that are not specifically shown or described herein being understood to be selectable from those known in the art.

FIG. 1 of the drawing illustrates a camera 10 having a housing 11, a viewfinder 12, a lens 13, a shutter-release member 14, a film-winding and shutter-cocking lever 15, and a socket 16 to operably support a multilamp flash unit 17 having a plurality of percussion-ignitable flashlamps therein. Depending from each percussion-ignitable flashlamp of unit 17 is a primer stem or ignition tube 18. Disposed in camera 10 is an actuating or striking member 19 having an end portion 20 that is movable into percussive contact with ignition tube 18 by a suitable camera mechanism (not shown). The point in the path of movement of end portion 20 at which end portion 20 contacts ignition tube 18, or some other part of the received flash unit responsive when struck to ignite a percussion-ignitable lamp in the unit, defines what will hereinafter be referred to as the firing site of the camera or other photographic apparatus. The present invention provides a means, in the form of an adapter, by which a camera of the kind illustrated in FIG. 1 can be used with a multilamp flash unit of the type having a plurality of electrically ignitable flashlamps, such a multilamp flash unit being described, for example, in U.S. Pat. No. 3,244,087, issued Apr. 5, 1966, in the name of L. F. Anderson et al.

An adapter constructed in accordance with one form of the preferred illustrated embodiment of the invention is shown in FIG. 2, which illustrates the camera 10 of FIG. 1 with an adapter 30 operably positioned thereon. Adapter 30 comprises a body portion 31 which has, at the top thereof, a socket 32 for receiving a multilamp flash unit 33 having a plurality of electrically ignitable flashlamps 34 therein. Suitably disposed in socket 32 are a plurality of pairs of electrical contacts 35 and 36, the number of pairs of contacts corresponding to the number of lamps 34 in the multilamp flash unit 33. Each pair of contacts 35 and 36 is electrically connected to a source of electrical potential, such as electrical cells 37 received in body portion 31, by wires 40, 41a, and 41b when a pair of conductors 38 and 39 depending from the bottom of body portion 31 are brought into contact with each other, there being one pair of conductors 38 and 39 and one set of connecting wires 40, 41a, and 41b for each pair of contacts 35 and 36. As shown in FIG. 2, the pairs of conductors 38 and 39 are insertable into socket 16 of camera 10, conductor 38 of the forward-facing pair being thereby positioned at the firing site of the camera, i.e., in the path of movement of end portion 20 of striking member or striker 19, conductor 39 being disposed in a position adjacent to but spaced from conductor 38.

FIG. 3 is a fragmentary view of a guard 41 that could be used on adapter 30 to partially enclose and thereby protect each pair of conductors 38 and 39 from damage before and during insertion of the conductors into socket 16. One such guard would depend rigidly from the bottom of body portion 31 of adapter 30 for each pair of conductors 38 and 39, the guards being insertable into corresponding portions of socket 16. Each guard 41 comprises an enclosure 42 having an opening 43 to permit access to conductor 38 by end portion 20 of striking member 19.

Referring to FIG. 2 with regard to the operation of adapter 30, striking member 19 is moved, in response to the camera operator's depression of shutter-release member 14, into percussive contact with conductor 38, thereby causing conductor 38 to be moved into contact with conductor 39. With conductors 38 and 39 in physical contact with each other, the circuit between cells 37 and the connected flashlamp 34 is closed and the connected lamp ignited. Because a camera of the kind illustrated as camera 10 is usually provided with a mechanism (not shown) for effecting rotation of socket 16 at some stage during the picture-taking cycle, it is assumed that operation of camera 10 results in rotation of adapter 30 and multilamp flash unit 33 from one lamp-firing position to the next. As adapter 30 and flash unit 33 are thus rotated, one pair of conductors 38 and 39 is moved away from the firing site of the camera while the succeeding pair of conductors 38 and 39, connected to the succeeding one of flashlamps 34, is moved into position at the firing site to be brought together by striking member 19 during the next operation of the camera.

The preferred embodiment of the present invention, which is incorporated in adapter 30 of FIG. 2, is illustrated schematically in FIG. 6. FIG. 6 shows, in schematic form, a portion of a camera housing 11', a camera socket 16', and, inserted in socket 16', a plug 90 having a pair of electrical conductors 91 and 92 depending therefrom, conductors 91 and 92 being connected by wires 93, 94, and 95 to an electrical cell 96 and an electrically ignitable flashlamp 97. Conductor 91 is resiliently movable into contact with conductor 92, in response to movement of end portion 20 of striking member 19 into percussive contact with conductor 91, to complete the circuit and thereby ignite lamp 97.

This embodiment, referred to herein as the preferred embodiment, is also incorporated in another form of adapter shown in FIG. 4. While adapter 30 of FIG. 2 is directly attachable to camera 10 as shown, adapter 50 of FIG. 4 is operatively positionable at a location remote from camera 10 by means of a flexible power cord 61 terminating in a plug 62 having a pair of conductors that are insertable into socket 16 of the camera. A remotely locatable adapter such as adapter 50 is desirable for producing special photoflash effects, as is well known in the photographic art.

Adapter 50 comprises a body portion 51, a base 52, and a socket 53 for receiving a multilamp flash unit 54 having a plurality of electrically ignitable flashlamps 55 therein. Operably disposed in socket 53 is a pair of electrical contacts 56 and 57 for electrically connecting a selected one of the flashlamps 55 to a source of electrical potential such as electrical cells 58 received in body portion 51. Included in an electrical circuit between contacts 56 and 57 and received cells 58 are wires 59, 60a, and 60b as shown. Wires 59 and 60b extend from body portion 51, through flexible power cord 61, to plug 61 and electrical conductors 63 and 64, respectively. Plug 62 is shown in FIG. 4 with conductors 63 and 64 inserted in socket 16 of camera 10, conductor 63 being thereby positioned at the firing site of the camera, i.e., in the path of movement of end portion 20 of striking member or striker 19, conductor 64 being disposed in a position adjacent to but spaced from conductor 63.

In operation, the camera operator's depression of release member 14 causes end portion 20 of striking member 19 to be moved into percussive contact with conductor 63, thereby moving conductor 63 into contact with conductor 64 to close the circuit and thereby ignite the connected flashlamp 55. Because camera 10 is assumed to have a mechanism (not shown) for effecting rotation of socket 16 at some stage of the picture-taking cycle, means must be provided, in the form of the preferred embodiment illustrated in FIG. 4, for preventing rotation of socket 16 when plug 62 is inserted therein. Such a means is provided in the form of a hook member 65, shown extending from a sidewall of plug 62 and around a corner of housing 11 to hold plug 62 and socket 16 in a fixed angular position, it being understood that such prevention of socket rotation will in no way harm a socket-rotating mechanism of the type commonly provided in a camera such as camera 10.

In using adapter 50 of FIG. 4, socket 53 may be rotated manually simply by turning flash unit 54 therein from one lamp-firing position to another. Or, a mechanism for automatically rotating socket 53 may be included within body portion 51, such a mechanism being shown schematically in FIG. 5 where it is designated generally by the reference numeral 70. Mechanism 70 includes a socket rotator 71 having a shaft portion 72 drivingly connected to socket 53 and rotatably movable by a biasing means such as spring 73. Secured at one end of shaft portion 72 is a disc portion 74 having a plurality of ratchet teeth 75 thereon disposed radially outwardly as shown, the number of ratchet teeth 75 corresponding to the number of flashlamps 55 in multilamp flash unit 54. To control the operation of socket rotator 71, mechanism 70 further includes an electromagnetic means such as solenoid 76 comprising an electromagnet 77, having a coil 78 electrically connected to the previously described circuit of adapter 50, and a movable member 79 which is pivotally mounted as at 80 and biased in a clockwise direction, as view in FIG. 5, by a spring 81. Movable member 79 has, at a midportion thereof, a pawl 82 which, as shown, lies in the path of movement of, and engages, one of the ratchet teeth 75 as shaft portion 72 and socket 53 are rotated, pawl 82 thereby preventing further rotation of socket 53. Upon electrical energization of coil 78, movable member 79 is electromagnetically attracted by electromagnet 77 to the position shown in dashed lines, the resulting counterclockwise rotation of member 79 being in opposition to the biasing force of spring 81 and, at the same time, disengaging pawl 82 from the engaged one of ratchet teeth 75. Such disengagement releases shaft portion 72 and socket 53 for rotation by spring 73 to a succeeding lamp-firing position. Inasmuch as the conductors 63 and 64 are but momentarily joined by the action of resilient striking member 19, solenoid 76 is but momentarily energized, after which spring 81 returns movable member 79 to its position shown in solid lines to engage the succeeding one of ratchet teeth 75 and thereby prevent further socket rotation. It will be understood that the mechanism 70 is shown in schematic form for the purpose of describing, in simplified terms, a means of rotating socket 53 in adapter 50, socket-rotating mechanisms per se being well known in the art. In operation, with a socket-rotating mechanism such as that shown schematically in FIG. 5 incorporated in adapter 50, the camera operator's depression of shutter-release member 14 effects both ignition of the connected flashlamp 55 and rotation of socket 53 to a succeeding lamp-firing position.

As will be apparent to those skilled in the art, a guard such as guard 41 shown in FIG. 3 may be used with plug 62 of adapter 50 to protect conductors 63 and 64 from damage before and during insertion of the conductors into socket 16 of the camera.

FIG. 7 illustrates schematically an alternative embodiment of the present invention. In FIG. 7 is shown, in schematic form, a portion of a camera housing 11', a camera socket 16', and, inserted in socket 16', a plug 100 having a pair of electrical conductors 101 and 102 depending therefrom, conductors 101 and 102 being connected by wires 103, 104, and 105 to an electrical cell 106 and an electrically ignitable flashlamp 107. As indicated, when plug 100 is inserted into socket 16', conductor 102 becomes electrically grounded to a common conducting member of the camera. Also grounded is the camera striking member 19, as shown. Movement of end portion 20 of striking member 19 into percussive contact with conductor 101 thus closes the electrical circuit between cell 106 and lamp 107 and ignites the lamp. Neither one of conductors 101 and 102 need be movable relative to the other since conductor 101 need only be contacted by striking member 19 to close the circuit and ignite the lamp. The alternative embodiment illustrated schematically in FIG. 7 could be incorporated, in lieu of the preferred embodiment illustrated schematically in FIG. 6, in the adapters of FIGS. 2 and 4, the primary consideration in the alternative embodiment being the electrical interconnection of conductor 102 and striking member 19 when plug 100 is inserted into the socket 16'.

As will be apparent to those skilled in the art, the different forms of the two embodiments shown and described herein are but illustrations of ways in which the present invention may be utilized to effect ignition of electrically ignitable flashlamps by operation of photographic apparatus designed for use with percussion-ignitable lamps.

The invention has been described in detail with particular reference to the illustrated preferred and alternative embodiments thereof, but it will be understood that variations and modifications can be effected within the spirit and scope of the invention.

I claim:

1. An adapter for use with photographic apparatus of the type having a firing site, means for detachably supporting a percussion-ignitable flashlamp at the firing site, and movable means for actuating a flashlamp supported at the firing site, said adapter comprising:
   a. means for operably receiving an electrically ignitable flashlamp;
   b. means for operably receiving a source of electrical potential; and
   c. means for electrically interconnecting said flashlamp-receiving means and said source-receiving means, said interconnecting means including switch means operatively associatable with the firing site of the photographic apparatus for closing said interconnecting means in response to movement of the actuating means of the apparatus; whereby an electrically ignitable flashlamp in said flashlamp-receiving means is ignited by a source of electrical potential in said source-receiving means in response to movement of the actuating means of the photographic apparatus when said switch means is operatively associated with the firing site of the apparatus.

2. The adapter claimed in claim 1 wherein said flashlamp-receiving means comprises a socket adapted to receive a multilamp flash unit having a plurality of electrically ignitable flashlamps, said socket being rotatable between successive lamp-firing positions, in each of which positions one of the lamps of a received multilamp flash unit is electrically connected to said interconnecting means.

3. The adapter claimed in claim 1 wherein said switch means includes a pair of electrical conductors detachably supportable by the flashlamps-supporting means of the photographic apparatus, one of said conductors, when so supported, being located in the path of movement of, and contactable by, the actuating means of the apparatus, the other of said conductors, when so supported, being electrically unconnected to said one conductor when the actuating means of the apparatus is spaced from said one conductor, said one conductor and said other conductor, when so supported, becoming electrically interconnected in response to movement of the actuating means of the apparatus into contact with said one conductor, thereby closing said connecting means.

4. The adapter claimed in claim 3 wherein said pair of electrical conductors, when supported by the flashlamp-supporting means of the photographic apparatus, are adjacent to each other, said one conductor being resiliently movable into momentary contact with said other conductor in response to movement of the actuating means of the apparatus into contact with said one conductor, thereby momentarily closing said connecting means.

5. The adapter claimed in claim 3 wherein, when said pair of electrical conductors are supported by the flashlamp-supporting means of the photographic apparatus, said other conductor is electrically connected to the actuating means of the apparatus, the actuating means of the apparatus, when moved into contact with said one conductor, electrically interconnecting said pair of conductors to close said connecting means.

6. For use with photographic apparatus having socket means for receiving a percussion-ignitable flashlamp and movable actuating means for percussively igniting a percussion-ignitable flashlamp received in the socket means, a device to ignite an electrically ignitable flashlamp comprising:
   a. a socket adapted to receive an electrically ignitable flashlamp;
   b. means for receiving a source of electrical potential; and
   c. circuit means for electrically connecting an electrically ignitable flashlamp received in said socket to a source of electrical potential received in said receiving means, said circuit means including first and second electrical conductors attachable to the photographic apparatus, said first conductor, when attached to the apparatus, being located in the path of movement of, and contactable by, the actuating means of the apparatus, said second conductor, when attached to the apparatus, being electrically unconnected to said first conductor when the actuating means is spaced from said first conductor, said second conductor, when attached to the apparatus, becoming electrically connected to said first conductor in response to movement of the actuating means into contact with said first conductor, thereby electrically connecting the received flashlamp to the received source of electrical potential; whereby an electrically ignitable flashlamp in said socket is ignited by a source of electrical potential in said receiving means in response to movement of the actuating means of the photographic apparatus into contact with said first conductor when said first and second conductors are attached to the apparatus.

7. The device claimed in claim 6 wherein said socket is adapted to receive a multilamp flash unit having a plurality of electrically ignitable flashlamps.

8. The device claimed in claim 7 wherein said socket is rotatable between successive lamp-firing positions, in each of which positions one of the lamps of a received multilamp flash unit is electrically connected to said circuit means.

9. The device claimed in claim 8 further comprising means for rotating said socket.

10. The device claimed in claim 9 further comprising electromagnetic means, electrically connected to said circuit means and operatively associated with said rotating means, for effecting socket rotation by said rotating means from a lamp-firing position to a succeeding lamp-firing position in response to energization of said circuit means.

11. The device claimed in claim 10 wherein said rotating means includes:
   a. biasing means for urging said socket rotatively from a lamp-firing position to a succeeding lamp-firing position; and
   b. retaining means for releasably retaining said socket in a lamp-firing position in opposition to said biasing means, said retaining means being movable by said electromagnetic means, in response to energization of said circuit means, to release said socket and thereby permit said biasing means to rotate said socket to a succeeding lamp-firing position.

12. The device claimed in claim 6 wherein said receiving means is adapted to receive an electrical cell.

13. The device claimed in claim 6 wherein said first and second electrical conductors are receivable in the socket means of the photographic apparatus to become electrically connected to each other in response to movement of the actuating means of the apparatus into contact with said first conductor.

14. The device claimed in claim 6 wherein said first and second electrical conductors, when attached to the photographic apparatus, are adjacent to each other, said first conductor being movable into contact with said second conductor in response to movement of the actuating means of the apparatus into contact with said first conductor.

15. The device claimed in claim 6 wherein, when said first and second electrical conductors are attached to the photographic apparatus, said second conductor is electrically connected to the actuating means of the apparatus, the actuating means of the apparatus, when moved into contact with said first conductor, functioning as an electrical switch to electrically connect said second conductor to said first conductor.

UNITED STATES PATENT OFFICE

CERTIFICATE OF CORRECTION

Patent No. 3,550,514      Dated December 29, 1970

Inventor(s) Donald M. Harvey

It is certified that error appears in the above-identified patent and that said Letters Patent are hereby corrected as shown below:

Column 1, line 6, delete "commonly assigned,"

Column 1, line 41, delete "commonly assigned,"

Signed and sealed this 29th day of June 1971.

(SEAL)
Attest:

EDWARD M. FLETCHER, JR.
Attesting Officer

WILLIAM E. SCHUYLER, JR.
Commissioner of Patents